(12) United States Patent
Ioffe et al.

(10) Patent No.: US 12,418,800 B2
(45) Date of Patent: *Sep. 16, 2025

(54) SYSTEMS, APPARATUS, AND METHODS FOR INDICATING SPECTRUM SHARING

(71) Applicant: Apple Inc., Cupertino, CA (US)

(72) Inventors: Anatoliy Sergey Ioffe, Redwood City, CA (US); Alexander Sayenko, Munich (DE); Elmar Wagner, Taufkirchen (DE); Piyush Kumar Garg, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1176 days.

This patent is subject to a terminal disclaimer.

(21) Appl. No.: 17/244,524

(22) Filed: Apr. 29, 2021

(65) Prior Publication Data
US 2021/0400498 A1     Dec. 23, 2021

Related U.S. Application Data

(60) Provisional application No. 63/041,648, filed on Jun. 19, 2020.

(51) Int. Cl.
*H04W 16/14* (2009.01)
*H04W 60/00* (2009.01)
*H04W 72/0453* (2023.01)

(52) U.S. Cl.
CPC ........... *H04W 16/14* (2013.01); *H04W 60/00* (2013.01); *H04W 72/0453* (2013.01)

(58) Field of Classification Search
CPC . H04W 16/14; H04W 60/00; H04W 72/0453; H04W 88/08
See application file for complete search history.

(56) References Cited

U.S. PATENT DOCUMENTS

| | | | |
|---|---|---|---|
| 2021/0022007 A1* | 1/2021 | McFadden | H04W 28/26 |
| 2021/0127346 A1* | 4/2021 | Hmimy | H04W 12/06 |

OTHER PUBLICATIONS

Wireless Innovation Forum; "Signaling Protocols and Procedures for Citizens Broadband Radio Service (CBRS): Spectrum Access System (SAS)—Citizens Broadband Radio Service Device (CBSD) Interface Technical Specification;" Document WINNF-TS-0016, Version V1.2.4; Jun. 26, 2019; 60 pages.

Sharma, Dheeraj; 5G-NR channel raster and sync raster; http://www.dheerajsharma.net/5g-nr-channel-raster-and-sync-raster/; May 18, 2018; 4 pages.

* cited by examiner

*Primary Examiner* — Marcus Hammonds
(74) *Attorney, Agent, or Firm* — FLETCHER YODER PC

(57) ABSTRACT

The present disclosure relates to systems and methods for indicating to a spectrum access system communication preferences of a base station and/or of a network operator. Different methods may be used to indicate the communication preferences, including a dedicated type parameter transmitted with spectrum allocation requests from the base station, a rule-based system where the spectrum access system accesses communication preferences of the base station and/or network operator through an identifier corresponding to a rule definition, or the like. The spectrum access system may assign a channel to the network operator based on its communication preferences, such as to determine a channel assignment to correspond to a channel aligned with a raster of communications to be used by the network operator.

20 Claims, 8 Drawing Sheets

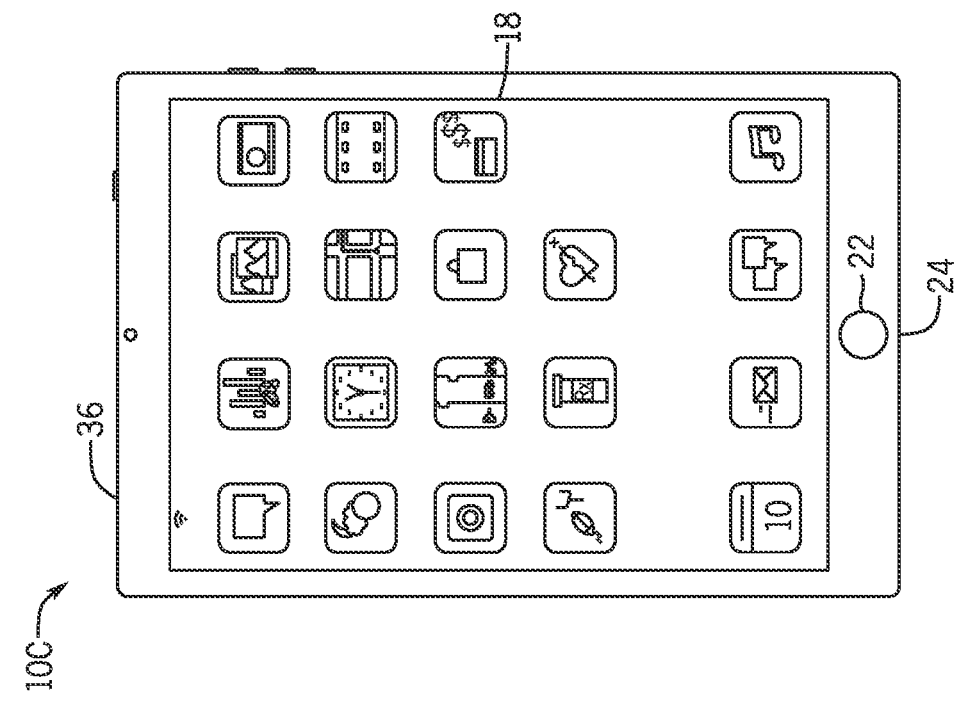
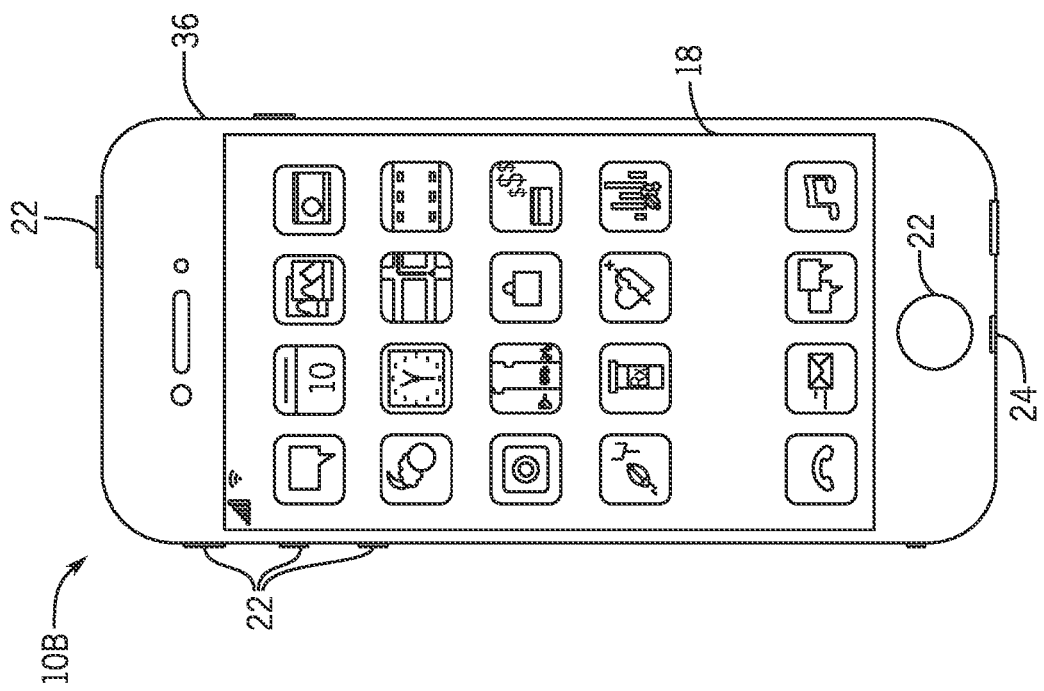

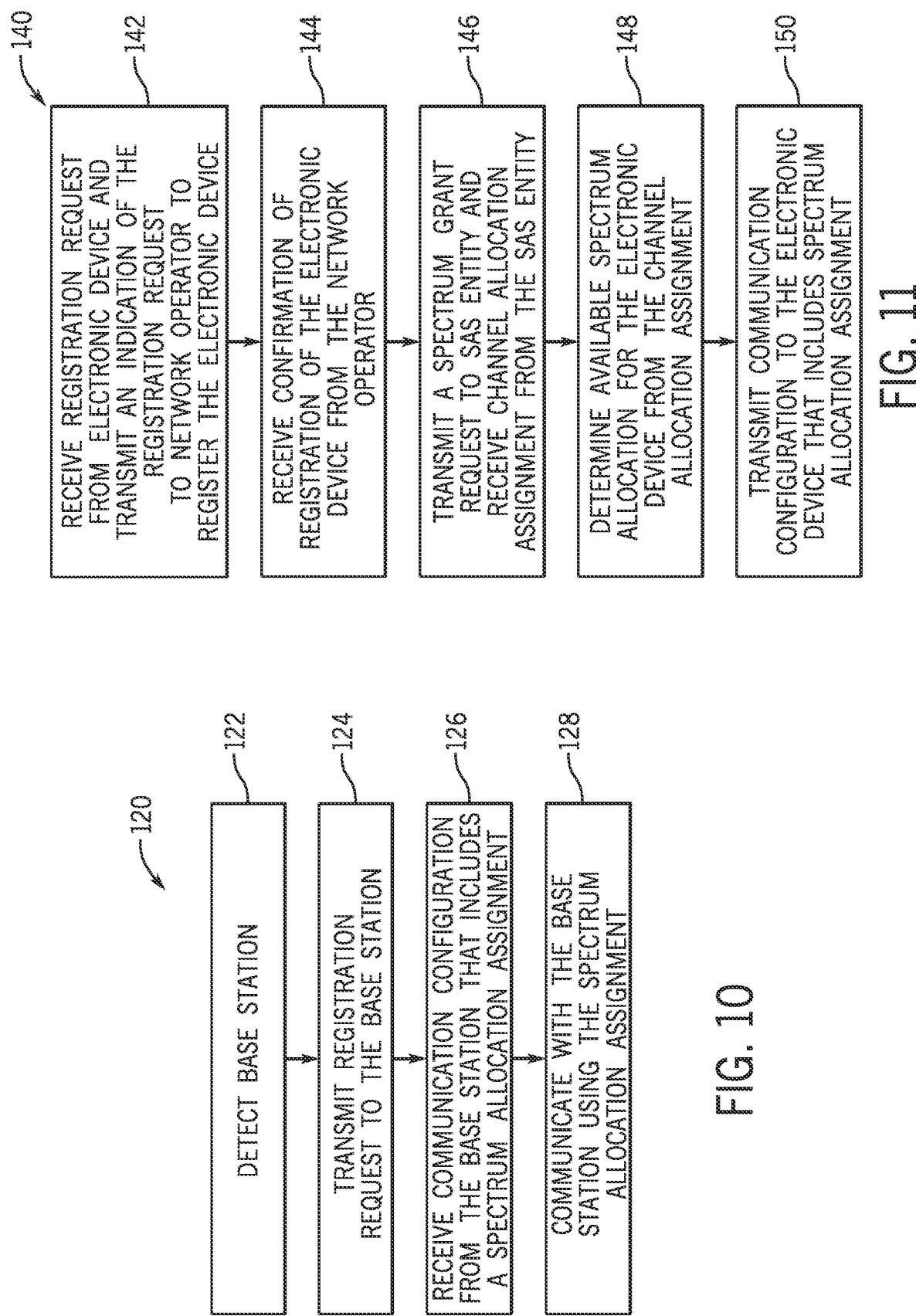

SYSTEMS, APPARATUS, AND METHODS FOR INDICATING SPECTRUM SHARING

CROSS-REFERENCE TO RELATED APPLICATIONS

This application is a non-provisional application claiming priority to U.S. Provisional Application No. 63/041,648, entitled "SYSTEMS, APPARATUS, AND METHODS FOR INDICATING SPECTRUM SHARING," filed Jun. 19, 2020, which is hereby incorporated by reference in its entirety for all purposes.

BACKGROUND

The present disclosure relates generally to electronic devices, and more particularly, to electronic devices that utilize radio frequency signals, transmitters, and receivers for wireless communication.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Wireless communication systems are rapidly growing in usage. Wireless electronic devices, such as smartphones and tablet computers, are becoming increasingly sophisticated. In addition to supporting telephone calls, many wireless electronic devices now provide access to the internet, email, text messaging, and navigation using the global positioning system (GPS), and are capable of operating sophisticated applications that utilize these functionalities.

Transmitters and/or receivers may be included in various electronic devices to enable communication between user equipment (e.g., user electronic devices, transmitting or receiving electronic devices, user devices) via wireless networks. The networks may be deployed through a variety of technologies including, but not limited to, access network base stations, such as an eNodeB (eNB) for long-term evolution (LTE) access networks and/or a next generation NodeB (gNB) for 5th generation (5G) access networks. In some electronic devices, a transmitter and a receiver are combined to form a transceiver. Transceivers may transmit and/or receive wireless signals by way of an antenna coupled to the transceiver, such as radio frequency (RF) signals indicative of data.

With the introduction of frequency range 2 (FR2), which includes frequency bands from 24.25 Gigahertz (GHz) to 52.6 GHz, in the release (Rel-16) of the New Radio standard release relating to 5G communications, a network deployment may experience challenges related to sharing and/or utilizing spectrums of the network. In a relatively simple deployment, a network operator managing a network deployed by network access nodes (e.g., radio access nodes, base stations) may be allocated a fixed-width portion from a shared pool of bandwidth (e.g., shared pool of radio spectrum resources). The shared pool of bandwidth may be managed by a spectrum access system (SAS) entity in communication with many network operators, and each network operator may at some point in time desire a respective portion of the shared pool of bandwidth to perform operations of their respective managed networks. However, allocating fixed-width portions of the spectrum may not enable efficient utilization of network resources, and may lead to some managed networks being under-loaded or over-loaded, such as when channel bandwidths are not allocated based on load usages or expected usages.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Recent advances in radio frequency network deployments have led to development of a managerial entity that manages allocation of portions of a shared radio spectrum between network operators. For example, recently developed communication standards provide for a shared (e.g., common) pool of bandwidth of a radio spectrum shared between multiple network operators, such as a Citizens Broadband Radio Service (CBRS) band. In this way, a managerial entity, such as a Spectrum Access System (SAS) entity, associated with management of the shared pool of bandwidth, may allocate available portions of the radio spectrum between the network operators. These network operators may include large and/or corporate entities, cellular providers, wireless service providers, wireless carriers, cellular companies, or mobile network carriers, or the like, and the SAS entity may be provided by a regulatory body, governmental body, an oversight corporate entity, or the like.

The shared pool of bandwidth may be divided between requesting network operators as fixed-width spectrum allocations. However, as described above, fixed-width allocations of a radio spectrum may not enable efficient utilization of network resources, and may lead to some managed networks being under-loaded or over-loaded, such as when allocated channel bandwidths are not allocated based on load usages and/or expected usages.

Dynamic bandwidth allocations may enable utilization of the radio spectrum based on dynamic allocation of resources. In this way, the SAS entity may allocate resources of the radio spectrum between requesting network operators based on a current load and/or expected network loads, thereby permitting efficient allocation of resources by assigning resources based on greatest determined demand. In this way, as loads of access networks increase or decrease, the SAS entity may adjust allocations of the spectrum.

In some cases, requests from the network operator may include an indication of expected load or current load, and/or may indicate an amount of a requested bandwidth determined by the network operator based on changes in expected network loads. Additionally or alternatively, the SAS entity may allocate portions of the radio spectrum based on geographical locations of the network operators and/or of radio access nodes of the network operators, incumbent services expected to be provided by each network operator (e.g., as provided by indicators of future demand and/or current demand for bandwidth), assigned priorities of each network operator, or the like.

Although sharing of the shared pool of resources may lead to more efficient allocations of resources since resources are allocated based on usage and/or a priority of network operators as opposed to fixed allocations, these above-described methods of spectrum allocation may be problematic when dynamic spectrum sharing (DSS) operations are implemented by a network operator. For example, some network operators may communicate exclusively over a first network (e.g., 4G/LTE), some exclusively over a second network (e.g., 5G/NR), while some network operators using DSS operations may use two or more networks to communicate, and thus may benefit from sharing a spectrum between two or more networks. To share a spectrum between multiple network types, such as between a 4th Generation (4G) network or Long Term Evolution (LTE) network, a $5^{th}$ Generation (5G) or New Radio (NR) network, or the like, the different configurations of each network should be considered and satisfied. The first network may use a first raster alignment (e.g., 100 kilohertz (kHz)) while the second network may use a second raster alignment (e.g., 15 kHz), and the first raster alignment may not be a multiple of the second raster alignment, and thus a third raster alignment (e.g., 300 kHz) representative of a multiple of one or more of the raster alignments may be implemented to compensate raster alignments of both networks.

DSS operations may permit the network operator using a base station to dynamically share portions of the radio spectrum between communications occurring over the first network and communications occurring over the second network, leading to improved levels of spectrum utilization. Levels of spectrum utilization may improve since the network operator is provided one spectrum allocation to be shared between two networks as opposed to two spectrum allocations for two networks. However, as described above, a center frequency and/or raster should be compatible with both the first network and the second network before the network operator is able to share the spectrum allocation between the two networks. Thus, the SAS entity assigning portions of a spectrum may inadvertently prevent an operator from communicating on the two networks at a base station, such as when the SAS entity assigns to a base station a portion of the spectrum compatible for one network that is incompatible with the other network. Indeed, systems and methods that enable the network operators to indicate to the SAS entity when DSS operations are expected to be used are desired, so that the SAS entity is able to allocate portions of the radio spectrum (e.g., frequency ranges, channels) to accommodate respective network configurations.

Enabling the network operator to notify the SAS entity of spectrum preferences and/or expected operations may result in efficient deployment of communication networks since the SAS entity may assign a portion of the spectrum based on the spectrum preferences and/or the expected operation, thereby reducing a likelihood of the SAS entity unintentionally preventing the network operator from implementing DSS operations.

In this way, when the network operator specifies to the SAS entity that the base station is to perform the first network (e.g., 4G/LTE) communications and not the second network (e.g., 5G/NR) communications, the SAS entity may allocate a portion of the spectrum aligned to a raster assigned to the first network communications (e.g., 100 kHz raster). When the operator specifies to the SAS entity that the base station is to perform the second network communications and not the first network communications, the SAS entity may allocate a portion of the spectrum aligned to a raster assigned to the first network communications (e.g., 30 kHz raster or 15 kHz raster). And, when the operator specifies to the SAS entity that the base station is to perform dynamic spectrum sharing to communicate using the first network (e.g., 4G/LTE) and the second network (e.g., 5G/NR) communications, the SAS entity may allocate a portion of the spectrum aligned to a raster assigned to both the first network communications and the second network communications (e.g., 300 kHz raster).

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 3 is a front view of a handheld device representing a second embodiment of the electronic device of FIG. 1;

FIG. 4 is a front view of another handheld device representing a third embodiment of the electronic device of FIG. 1;

FIG. 10 is a flowchart of a method for user equipment (e.g., the electronic device of FIG. 1) to communicate using an allocated portion (e.g., an assigned channel) of the spectrum of FIG. 8, in accordance with an embodiment of the present disclosure;

FIG. 11 is a flowchart of a method for operating a base station to request and implement an allocated portion of the spectrum of FIG. 8, in accordance with an embodiment of the present disclosure;

DETAILED DESCRIPTION

Figure 1:
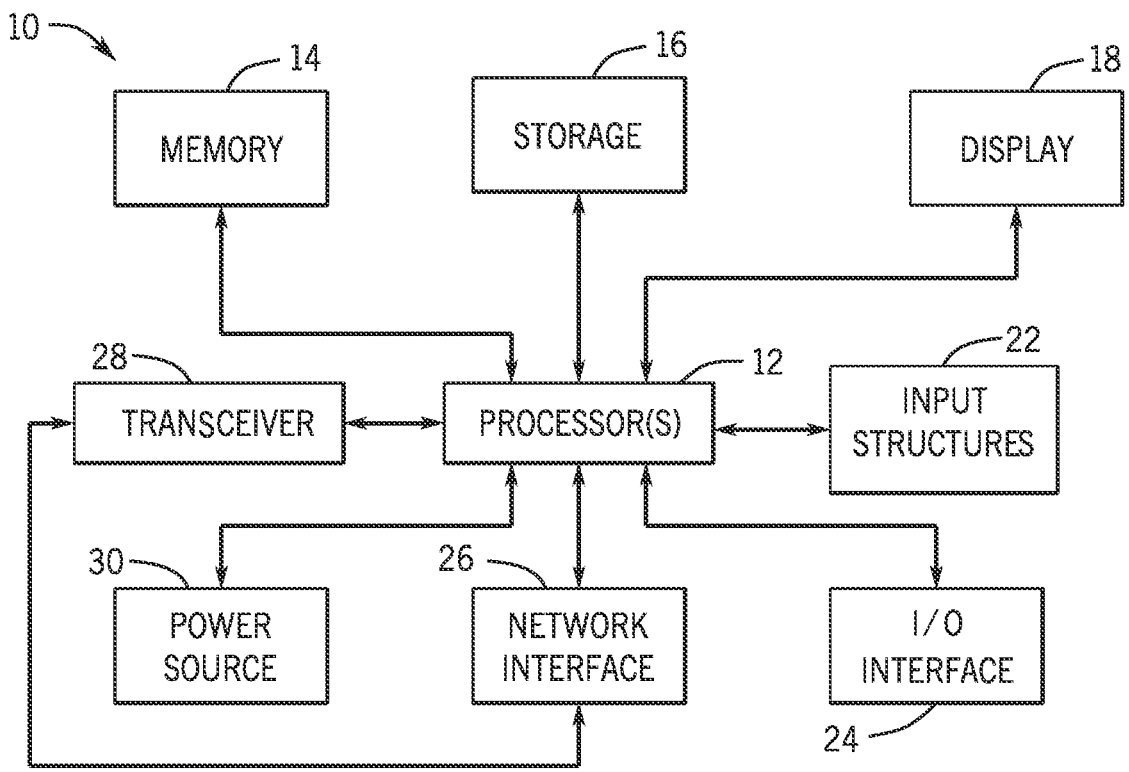
FIG. 1 is a schematic block diagram of an electronic device including a transceiver, in accordance with an embodiment of the present disclosure.

One or more specific embodiments of the present disclosure will be described below. These described embodiments are examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Various processes are disclosed that may adjust an operating frequency range of an antenna. The processes may apply to a variety of electronic devices. It is noted that a channel may be a medium used to convey information from a sender (transmitter) to a receiver. It should be noted that since characteristics of the term "channel" may differ according to different wireless protocols, the term "channel" as used herein may be considered as being used in a manner that is consistent with the standard characterizing a device that the term "channel" is referencing. In some standards, channel widths may be variable (e.g., depending on device capability, band conditions). For example, long-term evolution (LTE) networks may support scalable channel bandwidths from 1.4 Megahertz (MHz) to 20 MHz. In contrast, wireless local area network (WLAN) channels may be 22 MHz wide while BLUETOOTH® channels may be 1 Mhz wide. Other protocols and standards may include different definitions of channels. Furthermore, some standards may define and use multiple types of channels, such as different channels for uplink or downlink and/or different channels for different uses such as data, control information, or the like. Also, as used herein, the term "band" has the full breadth of its ordinary meaning, and at least includes a section of spectrum (e.g., radio frequency spectrum) in which channels are used or set aside for the same purpose.

Furthermore, in additional or alternative embodiments, a processor of an electronic device may indicate to a spectrum access system (SAS) entity what type of network that a network operator is expecting to deploy a network used to communicate with one or more user equipment, such as a network enabled with spectrum sharing or a network not enabled with spectrum sharing. The SAS entity may assign the network operator a channel (or frequency range) compatible with two or more networks in response to receiving an indication that the network operator is expecting to deploy a network with spectrum sharing, such that the channel is able to be shared between two network types (e.g., shared between a 4G/LTE network and a 5G/NR network). With the foregoing in mind, a general description of suitable electronic devices that may include such a processor is provided below.

Turning first to FIG. 1, an electronic device 10 according to an embodiment of the present disclosure may include, among other things, one or more of processor(s) 12, memory 14, nonvolatile storage 16, a display 18, input structures 22, an input/output (I/O) interface 24, a network interface 26, a transceiver 28, and a power source 30. The various functional blocks shown in FIG. 1 may include hardware elements (including circuitry), software elements (including computer code stored on a computer-readable medium) or a combination of both hardware and software elements. Furthermore, a combination of elements may be included in tangible, non-transitory, and machine-readable medium that include machine-readable instructions. The instructions may be executed by the processor 12 and may cause the processor 12 to perform operations as described herein. It should be noted that FIG. 1 is merely one example of a particular embodiment and is intended to illustrate the types of elements that may be present in the electronic device 10.

Figure 2:
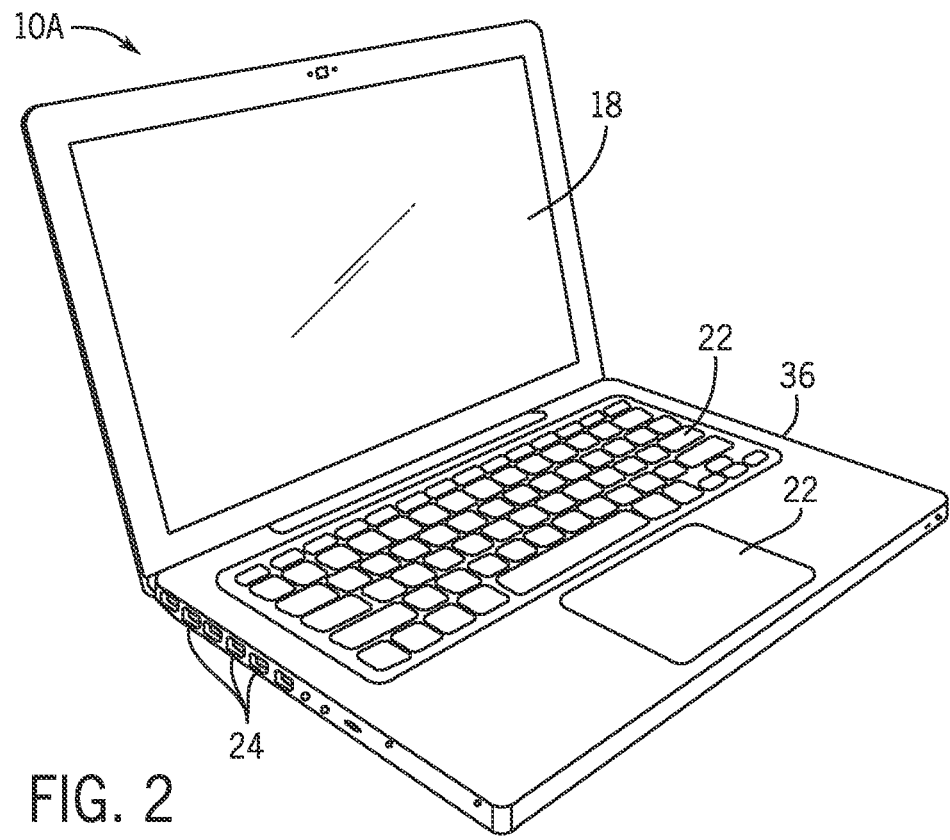
FIG. 2 is a perspective view of a notebook computer representing a first embodiment of the electronic device of FIG. 1.
Figure 5:
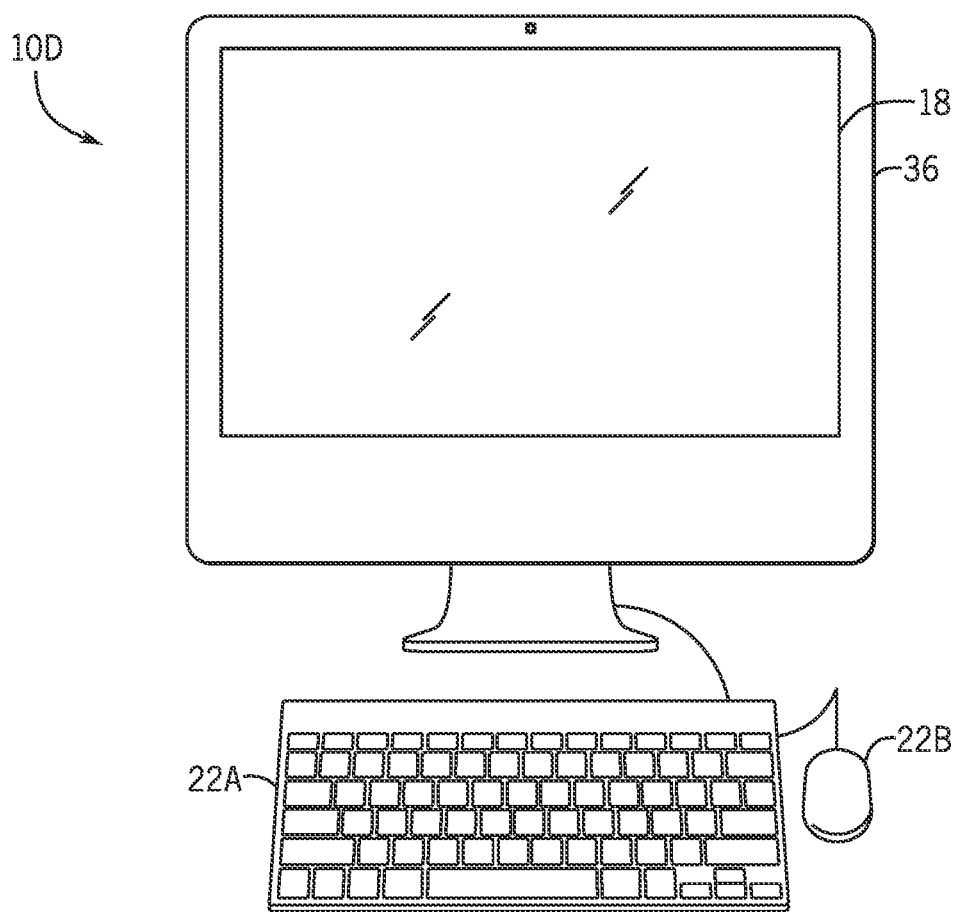
FIG. 5 is a front view of a desktop computer representing a fourth embodiment of the electronic device of FIG. 1.
Figure 6:
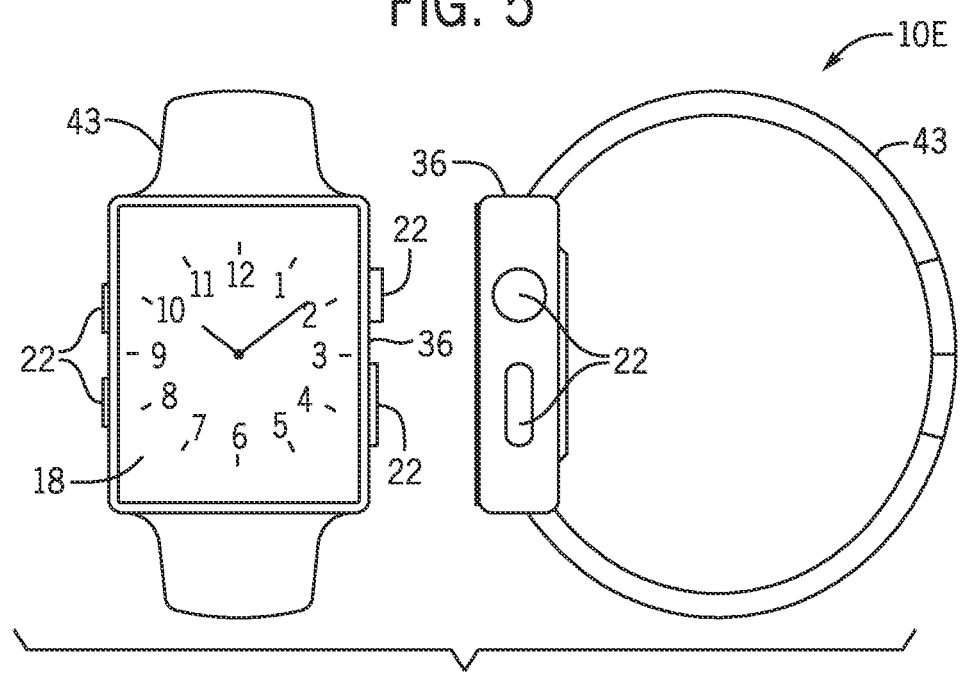
FIG. 6 is a front view and side view of a wearable electronic device representing a fifth embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor 12 may operably couple with the memory 14 and the nonvolatile storage 16 to perform various algorithms. Such programs or instructions executed by the processor 12 may be stored in any suitable article of manufacture that includes one or more tangible, computer-readable media at least collectively storing the instructions or processes, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions executable by the processor 12 to enable the electronic device 10 to provide various functionalities.

In certain embodiments, the display 18 may be a liquid crystal display (LCD), which may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more organic light emitting diode (OLED) displays, or some combination of LCD panels and OLED panels.

The processors 12 (e.g., as part of or in the form of a controller) may operate circuitry to input or output data generated by the electronic device 10. For example, the processors 12 may control and/or operate the memory 14, the nonvolatile storage 16, display 18, input structures 22, an input/output (I/O interface) 24, a network interface 26, a transceiver 28, a power source 29, or the like to perform operations of the electronic device 10 and/or to facilitate control of the operations of the electronic device. In particular, the processors 12 may generate control signals for operating the transceiver 28 to transmit data on one or more communication networks.

The input structures 22 of the electronic device 10 may enable a user to interact with the electronic device 10 (e.g., pressing a button to increase or decrease a volume level). The I/O interface 24 may enable the electronic device 10 to interface with various other electronic devices, as may the network interface 26. The network interface 26 may include, for example, one or more interfaces for a personal area network (PAN), such as a BLUETOOTH® network, for a local area network (LAN) or wireless local area network (WLAN), such as an 802.11x WI-FI® network, and/or for a wide area network (WAN), such as a $3^{rd}$ generation (3G) cellular network, $4^{th}$ generation (4G) cellular network, LTE cellular network, long term evolution license assisted access (LTE-LAA) cellular network, $5^{th}$ generation (5G) cellular network, or New Radio (NR) cellular network. The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

In some embodiments, the electronic device 10 communicates over the aforementioned wireless networks (e.g., WI-FI®, WIMAX®, mobile WIMAX®, 4G, LTE®, 5G, and so forth) using the transceiver 28. The transceiver 28 may include circuitry useful in both wirelessly receiving and wirelessly transmitting signals (e.g., data signals, wireless data signals, wireless carrier signals, RF signals), such as a transmitter and/or a receiver. Indeed, in some embodiments, the transceiver 28 may include a transmitter and a receiver combined into a single unit, or, in other embodiments, the transceiver 28 may include a transmitter separate from a receiver. The transceiver 28 may transmit and receive RF signals to support voice and/or data communication in wireless applications such as, for example, PAN networks (e.g., BLUETOOTH®), WLAN networks (e.g., 802.11x WI-FI®), WAN networks (e.g., 3G, 4G, 5G, NR, and LTE®) and LTE-LAA cellular networks), WIMAX® networks, mobile WIMAX® networks, ADSL and VDSL networks, DVB-T® and DVB-H® networks, UWB networks, and so forth. As further illustrated, the electronic device 10 may include the power source 30. The power source 30 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may be generally portable (such as laptop, notebook, and tablet computers) and/or those that are generally used in one place (such as desktop computers, workstations and/or servers). In certain embodiments, the electronic device 10 in the form of a computer may be a model of a MACBOOK®, MACBOOK® PRO, MACBOOK AIR®, IMAC®, MAC® mini, or MAC PRO® available from Apple Inc. of Cupertino, California. By way of example, the electronic device 10, taking the form of a notebook computer 10A, is illustrated in FIG. 2 in accordance with one embodiment of the present disclosure. The notebook computer 10A may include a housing or the enclosure 36, the display 18, the input structures 22, and ports associated with the I/O interface 24. In one embodiment, the input structures 22 (such as a keyboard and/or touchpad) may enable interaction with the notebook computer 10A, such as starting, controlling, or operating a graphical user interface (GUI) and/or applications running on the notebook computer 10A. For example, a keyboard and/or touchpad may facilitate user interaction with a user interface, GUI, and/or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an IPOD® or IPHONE® available from Apple Inc. of Cupertino, California. The handheld device 10B may include the enclosure 36 to protect interior elements from physical damage and to shield them from electromagnetic interference. The enclosure 36 may surround the display 18. The I/O interface 24 may open through the enclosure 36 and may include, for example, an I/O port for a hard wired connection for charging and/or content manipulation using a connector and protocol, such as the Lightning connector provided by Apple Inc. of Cupertino, California, a universal serial bus (USB), or other similar connector and protocol.

The input structures 22, in combination with the display 18, may enable user control of the handheld device 10B. For example, the input structures 22 may activate or deactivate the handheld device 10B, navigate a user interface to a home screen, present a user-editable application screen, and/or activate a voice-recognition feature of the handheld device 10B. Other of the input structures 22 may provide volume control, or may toggle between vibrate and ring modes. The input structures 22 may also include a microphone to obtain a user's voice for various voice-related features, and a speaker to enable audio playback. The input structures 22 may also include a headphone input to enable input from external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an IPAD® available from Apple Inc. of Cupertino, California.

Turning to FIG. 5, a computer 10D may represent another embodiment of the electronic device 10 of FIG. 1. The computer 10D may be any computer, such as a desktop computer, a server, or a notebook computer, and/or may be a standalone media player or video gaming machine. By way of example, the computer 10D may be an IMAC®, a MACBOOK®, or other similar device by Apple Inc. of Cupertino, California. It should be noted that the computer 10D may also represent a personal computer (PC) by another manufacturer. The enclosure 36 may protect and enclose internal elements of the computer 10D, such as the display 18. In certain embodiments, a user of the computer 10D may interact with the computer 10D using various peripheral input devices, such as keyboard 22A or mouse 22B (e.g., input structures 22), which may operatively couple to the computer 10D.

Similarly, FIG. 6 depicts a wearable electronic device 10E representing another embodiment of the electronic device 10 of FIG. 1. By way of example, the wearable electronic device 10E, which may include a wristband 43, may be an APPLE WATCH® by Apple Inc. of Cupertino, California. However, in other embodiments, the wearable electronic device 10E may include any wearable electronic device such as, a wearable exercise monitoring device (e.g., pedometer, accelerometer, heart rate monitor), or other device by another manufacturer. The display 18 of the wearable electronic device 10E may include a touch screen version of the display 18 (e.g., LCD, OLED display, active-matrix organic light emitting diode (AMOLED) display, and so forth), as well as the input structures 22, which may facilitate user interaction with a user interface of the wearable electronic device 10E. In certain embodiments, as previously noted above, each embodiment (e.g., notebook computer 10A, handheld device 10B, handheld device 10C, computer 10D, and wearable electronic device 10E) of the electronic device 10 may include the transceiver 28.

Figure 7:
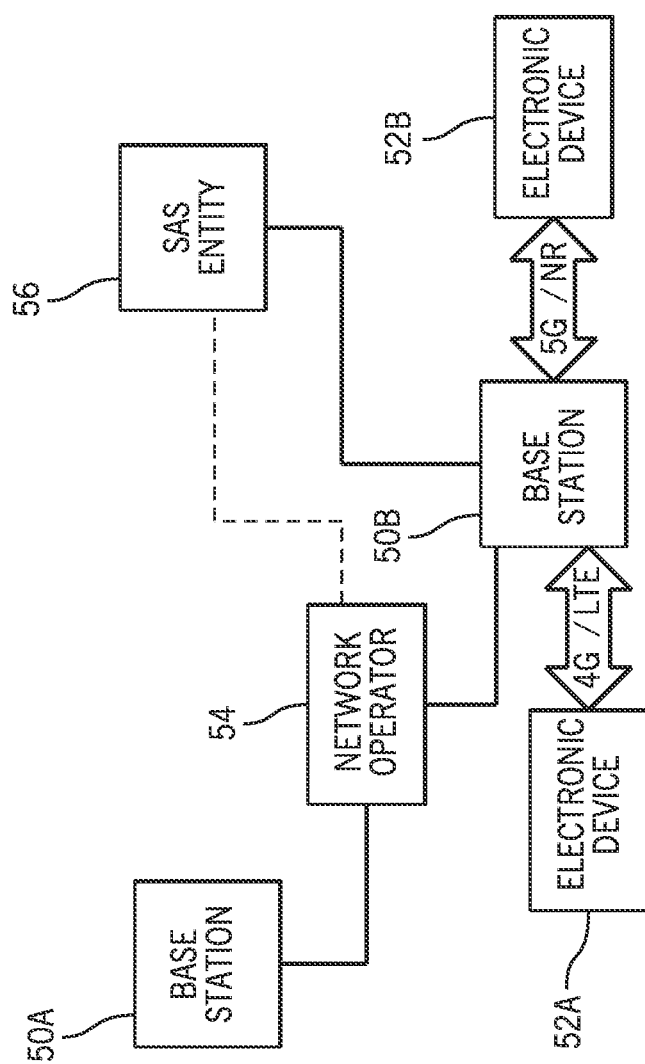
FIG. 7 is an illustration of base stations communicating with an electronic device, such as the electronic device of FIG. 1, in accordance with an embodiment of the present disclosure.

Keeping the foregoing in mind, FIG. 7 is an illustration of access network nodes communicating with the electronic device 10, according to embodiments of the present disclosure. The access network nodes may include devices such as an eNodeB (eNB) for long-term evolution (LTE) access networks and/or a next generation NodeB (gNB) for 5th generation (5G) access networks. For ease of discussion, eNBs and gNBs, and any other network nodes for various other communication networks, are referred to as base stations 50 (e.g., base station 50A, base station 50B). FIG. 7 also depicts user equipment (UE), such as an electronic device 52 (which may include the electronic device 10). Each of the base stations 50 and/or the electronic device 52 may have one or more components similar to the electronic device 10, and thus may include control circuitry, such as the processor 12, and/or memory circuitry, such as the memory 14 and/or nonvolatile storage 16, which may operate together to respectively cause the base stations 50 and/or the electronic device 52 to perform respective operations.

It is noted that user equipment able to communicate with the base stations 50 may include any of various types of computer systems device which are mobile or portable and which performs wireless communications. Examples of user equipment any suitable portable electronic devices, mobile telephones, smart phones, portable gaming devices, laptops, wearable devices, or the like. In general, the term "user equipment," "UE," or "UE device" may broadly be defined to encompass any electronic, computing, and/or telecommunications device (or combination of devices) transportable by a user and capable of wireless communication, including the electronic device 52.

A network operator 54 (used interchangeably with "network provider") may use the base stations 50 as physical communication nodes to deploy a radio network managed by the network operator 54 over one or more cells (e.g., regions) managed by each respective base station 50. In particular, each of the base stations 50 may be associated with one or more cells or regions and thus may provide access to the radio network for each electronic device 52 physically or logically located in the cell or region that the respective base station 50 serves. The term "base station" has the full breadth of its ordinary meaning, and at least includes a wireless communication station installed at a location that is used to communicate as part of a wireless telephone system or radio system, such as the radio network managed by the network operator.

The base stations 50 and the electronic device 52 may communicate over a transmission medium (e.g., air, atmosphere, water) using any of various radio access technologies (RATs), also referred to as wireless communication technologies or telecommunication standards, including Global System for Mobile Communications (GSM), Universal Mobile Telecommunications Service (UMTS) associated with, for example, Wideband Code Division Multiple Access (WCDMA) or Time Division Synchronous Code Division Multiple Access (TD-SCDMA) air interfaces, Long-Term Evolution (LTE), LTE-Advanced (LTE-A), 5G New Radio (5G NR), High Speed Packet Access (HSPA), 3rd Generation Partnership Project (3GPP), $3^{rd}$ Generation Partnership Project 2 (3GPP2), Code Division Multiple Access (CDMA), Code Division Multiple Access 2000 (CDMA2000) (e.g., Single-Carrier Radio Transmission Technology (1×RTT) air interface standard, Evolution-Data Optimized (1×EV-DO), High-Rate Packet Data (HRPD), Evolved High Rate Packet Data (eHRPD)), or the like. Note that if a respective base station of the base stations 50 is implemented in the context of LTE, it may alternately be referred to as an "eNodeB" or "eNB", and that if a respective base station of the base stations is implemented in the context of 5G NR, it may alternately be referred to as "gNodeB" or "gNB."

Thus, base stations 50 may act as "serving cells" for electronic devices 52 disposed or located (e.g., logically, physically) within a cell, where the cell may be defined as where the base station 50 is located or nearby (e.g., a threshold distance from the base station 50). Indeed, each serving cell may communicate with user equipment using a subset of a radio spectrum dedicated to that communicative coupling, sometimes referred to as a "subcarrier". A subcarrier may be dedicated to communications between the electronic device 52 and a network operator 54 via the base stations 50, such as base station 50B. In some cases, the subcarrier may be referred to interchangeably as a "component carrier," a "sub-carrier," and/or a "sub-channel" and may be managed by the base station 50B. Thus, the base station 50B, as a serving cell, serves as the radio access point on behalf of a network operator 54 to enable communication to occur between the network operator 54 and an electronic device 52 while the electronic device 52 is located within boundaries (e.g., logically-defined boundaries, volume-defined boundaries, area-defined boundaries) of a cell managed by the network operator 54 via the corresponding base station 50.

The base stations 50, when deploying one or more networks on behalf of network operators, may respectively communicate with user equipment (e.g., electronic devices 52) using a first network (e.g., 4G/LTE), a second network (e.g., 5G/NR), or both. For example, the base station 50B may communicate with the electronic device 52A using the first network (e.g., 4G/LTE), and may communicate with a second electronic device 52B (e.g., additional user equipment) using the second network (e.g., 5G/NR) when capable of performing DSS operations and/or when allocated two portions of a radio spectrum (e.g., one portion to be used for the first network and the other portion to be used for the second network). Since a limited number of frequencies exist within a frequency spectrum, networks may be more efficiently deployed when a spectrum access system (SAS) entity 56 enables communication using both the first network and the second network (or any number of shared networks) by assigning a frequency range compatible with both communications on the first network and on the second network. When using a frequency compatible with both, for example when the frequency range aligns with a spectrum raster for both the first network and the second network, a respective base station of the base stations 50 may use both networks without resetting the channel (e.g., adjusting frequency ranges) used for communicating when changing the network used for communication.

It is noted that these systems and methods may be used to deployed networks of different types than 4G/LTE or 5G/NR. For example, these systems and methods may be used to provide a spectrum shared between a 2G network, a 3G network, and a 4G network, or any other suitable combination of networks. It is also noted that several variations of communication interconnections between the network operators 54, the base stations 50, SAS entity 56, and the electronic devices 52 is shown in FIG. 7. In this way, any suitable communicative couplings may be used to interconnect the components of the depicted system to facilitate operation and/or communication between the components. For example, in one network system, the network operator 54 may communicate directly with the SAS entity 56, however in another network system, the network operator 54 may sometimes communicate with the SAS entity 56 or exclusive communicate with the SAS entity 56 via the base station. Other combinations of these communicative couplings not depicted may also be compatible with the descriptions herein.

Figure 8:
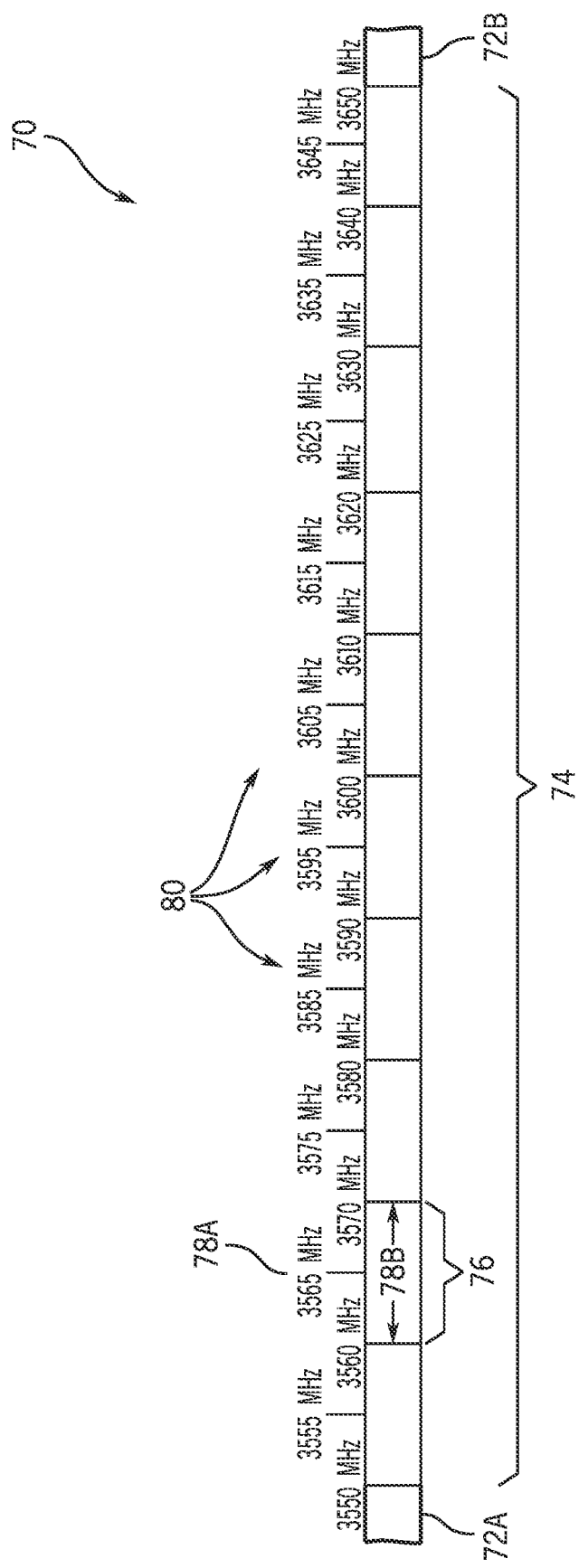
FIG. 8 is an illustration of an example spectrum available for assignment to the base stations of FIG. 7, in accordance with an embodiment of the present disclosure.

To elaborate, FIG. 8 is an illustration of an example radio spectrum 70 available for assignment to the base stations 50, according to embodiments of the present disclosure. When communicating with the electronic device 52, a respective base station, for example the base station 50B, may transmit messages on subsets or "sub-spectrums" of a total radio spectrum (e.g., spectrum, frequency spectrum). In some embodiments, a few portions 72 (e.g., portion 72A, portion 72B) of the total radio spectrum 70 may be reserved, such as for federal use (e.g., for use by a government), while another portion 74 of the total radio spectrum 70 may be shared between multiple network operators, such as incumbent access operators, priority access operators, and/or general authorized access operators. Indeed, the portion 74 may be dedicated as a general-use and/or an open-access band, such as a Citizens Broadband Radio Service (CBRS) band. The portion 74 may be divided into any number of channels 76, where each channel may be respectively assigned to one or more network operators. The various network operators may, in some cases, each correspond to an assigned priority used by an SAS entity 56 when prioritizing allocations of the spectrum portion 74. For example, in determining a sequence or order for which each network operator is allocated one or more channels 76, the SAS entity 56 may determine that incumbent access operators are granted higher priority than the priority access operators, and that the priority access operators are granted higher priority than the general authorized access operators.

The channels 76 may be defined by the SAS entity 56 via channel parameters 78, including center frequency 78A and a bandwidth 78B. The bandwidth 78B may be defined by a frequency band, which may include one or more of the frequency ranges and be delimited by a lower frequency and a higher frequency. Channel rasters 80 may respectively define a channel center frequency 78A for a channel In this way, different networks employing different channel width configurations may use various of the channels 76 due to the channels 76 having different frequency increments between the channel rasters 80. That is, the SAS entity 56 may dynamically set a channel raster 80 as a channel center frequency 78A when dynamically allocating a respective channel 76 to a network operator.

Furthermore, each channel 76 may be further sub-divided into sub-channels (not pictured), where each sub-channel may have a respective center frequency and respective bandwidth. Messages transmitted using frequencies within a same frequency band (e.g., channel 76) but using separate sub-channels (e.g., component carriers) having different frequency ranges within the same frequency band may be transmitted (e.g., concurrently) without cross-interference.

Some frequency ranges may defined by a standards body (e.g., standards generated by the Third Generation Partnership Project (3GPP) standards body or development group) as for a specific use (e.g., purpose) and/or for a specific type of communication. That is, standards bodies may define frequency bands for different communication protocols and/or communication networks, and thus may include different frequency bands for a 3rd generation (3G) frequency band, 4th generation (4G) frequency band, 5th generation (5G) frequency band, or the like. For example, frequencies between 24 Gigahertz (GHz) and 48 GHz may be reserved for 5G/NR network communications. However, as illustrated, a narrow band (e.g., frequencies between 3.5 GHz and 3.6 GHz, frequencies between 3550 MHz and 3650 MHz) may be reserved as the general-use band (e.g., portion 74), such as the CBRS band corresponding to the spectrum portion 74 described-above.

Indeed, a first network operator that deploys a first network (e.g., a 4G/LTE network) and a second network operator that deploys a second network (e.g., a 5G/NR network) may both use the general-use band for communication. The SAS entity 56 may arbitrate access to portions of the radio spectrum portion 74 between the various network operators requesting access to a respective portion of the radio spectrum portion 74 (e.g., based on the respective network). Each network operator may submit a preference to the SAS entity 56 when requesting a frequency band for communication via a spectrum grant request. The SAS entity 56 may consider preferences when assigning channels 76, but may additionally or alternatively consider relative priorities of the network operators requesting access.

Thus, the presently disclosed techniques may enable network operators to notify the SAS entity 56 of their respective communication capabilities and preferences when requesting a channel 76 for their network. This may include, for example, the network operators enhancing a grant request message transmitted to the SAS entity 56 when requesting an allocation of the spectrum portion 74. The network operators may enhance the grant request message with information that indicates to the SAS entity 56 a network type used by the network operator (e.g., DSS deployment, non-DSS deployment).

To request a channel 76, the network operator may, using one of the base stations 50, such as base station 50B, transmit a registration request to the SAS entity 56 and receive a response from the SAS entity 56 confirming the registration. The network operator may, using the base station 50B, continue by transmitting a spectrum grant request that includes a usage type parameter. The network operator may, using the base station 50B, may additionally or alternatively transmit additional information regarding communication capabilities and preferences for reference by the SAS entity 56 when allocating a channel to the network operator. The usage type parameter may indicate what networks the network operator is expecting to use (e.g., a first network, a second network, or both in DSS operations). The SAS entity 56 may respond to the network operator, via the base station 50B, to confirm receipt of the spectrum grant request. The SAS entity 56 may transmit the spectrum allocation to the network operator, via the base station 50B, after determining which channel 76 to allocate to the network operator based on the usage type parameter and/or the additional information included in the spectrum grant request. For example, the spectrum allocation sent by the SAS entity 56 may include an indication of a channel 76 defined as a frequency range to be used for communication.

Figure 9A:
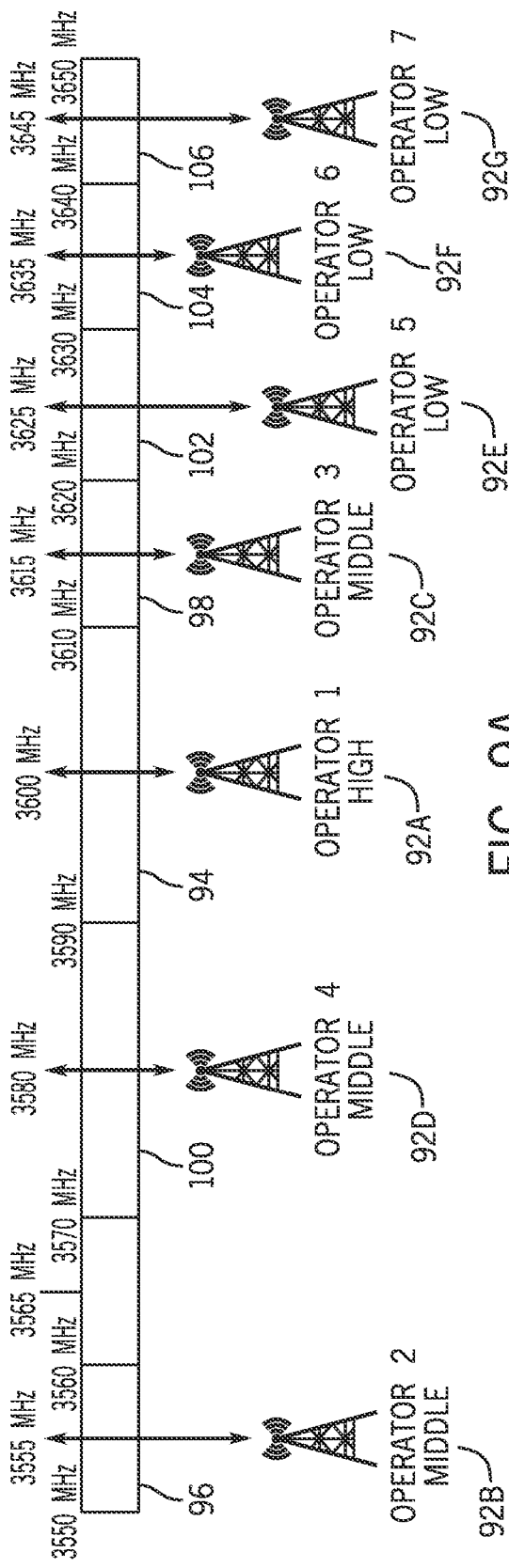
FIG. 9A is an illustration of a first spectrum allocation of the example spectrum of FIG. 8, where each spectrum allocation request is granted, in accordance with an embodiment of the present disclosure.

To elaborate, FIG. 9A is an illustration of a first spectrum allocation example operation of the SAS entity 56 determining to allocate respective channels 76 of the spectrum 70 shown in FIG. 8 to multiple network operators 92, according to embodiments of the present disclosure. A first operator 92A (e.g., a respective network operator of the network operators 92) may correspond to a highest priority of the SAS entity 56, a second operator 92B, a third operator 92C, and a fourth operator 92D may each correspond to a middle priority of the SAS entity 56, and the remaining operators (e.g., fifth operator 92E, sixth operator 92F, seventh operator 92G) may correspond to a lowest priority of the SAS entity 56. Each operator 92 may request a spectrum allocation from the SAS entity 56 based on which communication operations the respective operator network desires to perform and a desired bandwidth. In this example, the operators 92 request spectrum allocation based on LTE-exclusive communication operations, NR-exclusive communication operations, or LTE/NR DSS communication operations (where both LTE and NR may be used to communicate) in their respective spectrum grant requests. The SAS entity 56, in response to the spectrum grant request, determines a channel compatible with parameters of the spectrum grant request, such as compatible with a raster of the network to be used by the respective operator 92, and assigns the channel to the respective operator 92.

A raster defines a reference radio frequency in a frequency range that may be used to identify the uplink and downlink channel positions of a given network type for a particular network operator. Each channel center frequency may be a multiple of a raster. Rasters may include frequency intervals that UEs use to scan channels 76 to synchronize with a network, to identify themselves with the network, acquire knowledge regarding a network that the UE is attempting to connect with, or the like.

In this way, each channel available for assignment to a particular network operator corresponds to a multiple of a raster used to provide a network type of the network to be deployed by the network operator. For example, when the network operator is to deploy a 4G/LTE network, the raster used is 100 kHz, while when the network operator is to deploy a 5G/NR network, the raster used is either 15 kHz or 30 kHz based on, for example, particulars of the network deployment and/or operating policies of the SAS entity 56 defining which raster to use to assign channels. Since different network types may communicate using relatively more narrowband or more wideband communications, different networks may use different rasters to define eligible channels for allocation to a respective network operator.

To elaborate, the first operator 92A may request, via a spectrum grant request, a channel 76 compatible with DSS operations for a first network and a second network (e.g., compatible with both LTE communications and NR communications), and a bandwidth allocation of at least 20 MHz from the SAS entity 56. Based on the request for a DSS operation compatible channel, the SAS entity 56 may identify which of the channels 76 are characterized by a center frequency that aligns with a raster for the first network and a raster for the second network. For example, the SAS entity 56 assigns to the first operator 92A a 20 MHz frequency range referred to as a channel 94 (e.g., a channel defined between approximately 3590 MHz and 3610 MHz having a center frequency at 3600 MHz) that was determined to be compatible with DSS operations. In particular, the channel 94 may be compatible with DSS operations for the 4G/LTE network and the 5G/NR network because the center frequency of 3600 MHz (i.e., 3,600,000 kHz) aligns with a 300 kHz raster, which is a multiple of both the 100 kHz raster of the 4G/LTE network and the 15 kHz or 30 kHz of the 5G/NR network. That is, the channel 94 is characterized (e.g., includes) a center frequency aligned on a raster that is a multiple of respective rasters of the first network and the second network. Comparing FIG. 9A to FIG. 8, the channel 94 extends beyond the 10 MHz channels (e.g., channels 76) shown in FIG. 8. The SAS entity 56 may thus allocate any portion of the spectrum portion 74 to any operator that the SAS entity 56 deems suitable.

The second operator 92B and the third operator 92C may request, via respective spectrum grant requests to the SAS entity 56, respective channels 76 compatible with DSS operations (e.g., compatible with both LTE communications and NR communications), and bandwidth allocations of at least 10 MHz. The SAS entity 56 may assign a channel 96 to the second operator 92B, and assign a channel 98 to the third operator 92C, each channel (e.g., channel 96, channel 98) being compatible with DSS operations (e.g., raster aligning on 300 kHz) and having a bandwidth allocation substantially equal to 10 MHz. In particular, the channel 96 is assigned a range of frequencies between approximately 3550 MHz and 3560 MHz having a center frequency at 3555 MHz, and the channel 98 is assigned a range of frequencies between approximately 3610 MHz and 3620 MHz having a center frequency at 3615 MHz. In particular, the channels 96, 98 may be compatible with DSS operations for the 4G/LTE network and the 5G/NR network because the center frequencies of 3555 MHz (i.e., 3,555,000 kHz) and 3615 MHz (i.e., 3,615,000 kHz) align with a 300 kHz raster, which is a multiple of both the 100 kHz raster of the 4G/LTE network and the 15 kHz or 30 kHz of the 5G/NR network.

The fourth operator 92D may request, via a spectrum grant request to the SAS entity 56, or a channel 76 compatible with LTE operations, and a bandwidth allocation of at least 20 MHz. The SAS entity 56 may assign a channel 100 to the fourth operator 92D, where the channel 100 is assigned a range of frequencies equal to 20 MHz between approximately 3570 MHz and 3590 MHz having a center frequency at 3580 MHz. The center frequency for the channel 100 is selected by the SAS entity 56 for the fourth operator 92D since the center frequency of 3580 MHz (i.e., 3,580,000 kHz) aligns with one of many eligible center frequencies for use with LTE communications (e.g., raster aligning on 100 kHz designated for LTE communications) without aligning for one of many eligible center frequencies for use with NR communications, and thus cannot be used for NR communications. It is noted that the 20 MHz allocations (e.g., channel 100, channel 94) are depicted as approximately twice the width as the 10 MHz allocations (e.g., channel 96) in FIG. 9A. The SAS entity 56 may assign to the remaining operators (e.g., fifth operator 92E, sixth operator 92F, seventh operator 92G) 10 MHz allocations at center frequencies of 3625 MHz (e.g., channel 102), 3635 MHz (e.g., channel 104), and 3645 MHz (e.g., channel 106) in response to preferences submitted by these operators via respective spectrum grant requests. In particular, the preferences submitted by these operators may have indicated that the fifth operator 92E, the sixth operator 92F, and the seventh operator 92G each desired a 10 MHz channel able to be used for non-DSS, LTE-exclusive network deployments (e.g., communications). The channels, such as the channel 102, the channel 104, and the channel 106, may be considered unallocated frequency ranges before being assigned to one of the network operators. The channel 102 is assigned a range of frequencies between approximately 3620 MHz and 3630 MHz having a center frequency at 3625 MHz (i.e., 3,625,000 kHz) and the channel 104 is assigned a range of frequencies between approximately 3630 MHz and 3640 MHz having a center frequency at 3635 MHz (i.e., 3,635,000 kHz). Furthermore, the channel 106 is assigned a range of frequencies between approximately 3640 MHz and 3650 MHz having a center frequency at 3655 MHz (i.e., 3,655,000 kHz). It is noted that, in some cases, one network operator may transmit multiple requests, such as one request from multiple base stations 50 and/or multiple requests from a single base station 50. In these cases, the SAS entity 56 may assign more than one channel 76 to the network operator to assign relatively larger amounts of frequency ranges to the network operator.

Figure 9B:
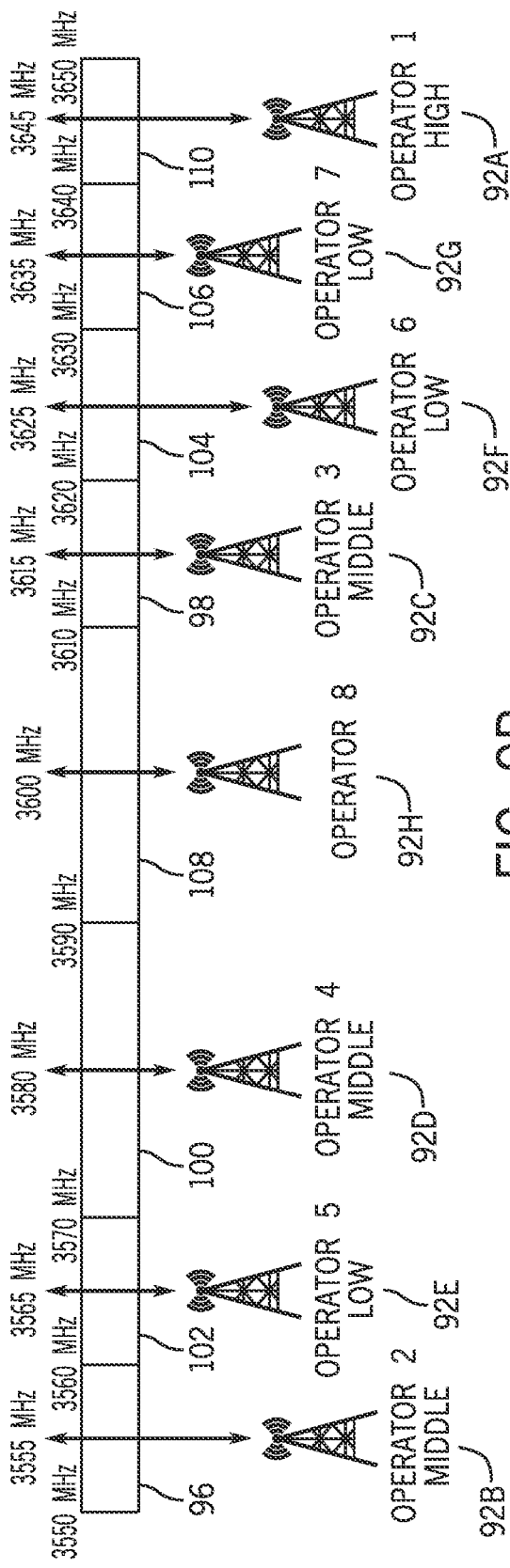
FIG. 9B is an illustration of a second spectrum allocation of the example spectrum of FIG. 8, where at least some spectrum allocation requests are not granted, in accordance with an embodiment of the present disclosure.

In some cases, however, the SAS entity 56 may not be able to grant each request and/or indicated preference of each network operator. For example, FIG. 9B is an illustration of a second spectrum allocation example, according to embodiments of the present disclosure. Presuming same priorities as in FIG. 9A and same requests for each operator 92 discussed, in some cases, the SAS entity 56 changes an allocation and does not grant the exact allocation requested.

For example, the first operator 92A may request, via a spectrum grant request, a channel 76 compatible with DSS operations (e.g., compatible with both LTE communications and NR communications) and a bandwidth allocation of at least 20 MHz. Instead, the SAS entity 56 may partially grant the request of the first operator 92A. This may happen when, for example, the SAS entity 56 determines that a portion of the spectrum portion 74 (e.g., channel 108) has already been allocated to a network operator (e.g., eighth operator 92H), where the portion (e.g., channel 108) may have otherwise matched a configuration indicated in the spectrum grant request from the first operator 92A. Thus, the SAS entity 56 may grant the first operator 92A a 10 MHz channel having a center frequency of 3645 MHz as a channel 110 as opposed to the channel 94 (e.g., a 20 MHz channel having a center frequency of 3600 MHz exemplified in FIG. 9A). The SAS entity 56 may determine that the center frequency of 3645 MHz is compatible with DSS operations since the center frequency of 3645 MHz is aligned to a raster of both LTE communications and NR communications (e.g., 300 kHz raster used for DSS operations of LTE and NR communications). To make room for the channel 110 using a relatively higher frequency of the spectrum portion 74 than that of the channel 94 in FIG. 9A for the first operator 92A, the SAS entity 56 may allocate channel assignments for the other operators 92 similarly as described in FIG. 9A, except the channel allocations for the fifth operator 92E, sixth operator 92F, and seventh operator 92G. These channel allocations may continue to be 10 MHz allocations compatible with LTE communications and incompatible with NR communications (due to the raster alignments of the center frequencies). However, the SAS entity 56 may shift the channel allocations to have center frequencies of 3625 MHz (e.g., channel 104), 3635 MHz (e.g., channel 106), and 3565 MHz (e.g., channel 102), respectively. It is noted that the SAS entity 56 moving the channel 102 to a lower frequency than the channel 104 or the channel 106 is merely an example, and the SAS entity 56 may instead perform any order of shifting or no shifting at all.

As described above, the base stations 50, as a proxy and/or representative actor of the network operator 54 (e.g., network provider), may transmit communication preferences to the SAS entity 56 when registering to (e.g., requesting) a spectrum allocation of the spectrum 70 for use with communication with user equipment requesting access to a network deployed by the network operator 54. In this way, methods described in reference to FIG. 10-13 elaborate on communications and/or operators of the user equipment, base station, and SAS entity 56 to provide further explanation of these systems. FIG. 10 is a flowchart of a method 120 for operating user equipment (e.g., electronic device 10, electronic device 52) to communicate using an allocated portion of the spectrum 70 (e.g., an assigned channel), according to embodiments of the present disclosure. It is noted that, although depicted in a particular order, the blocks of the method 120 may be performed in any suitable order, and at least some blocks may be skipped altogether. As described herein, the method 120 is described as performed by the electronic device 52, however, it should be understood that any suitable processing and/or control circuitry may perform some or all of the operations of the method 120, such as one or more of the processors 12.

At block 122, the electronic device 52 detects one of the base stations 50. For ease of discussion, the method 120 is discussed in terms of electronic device 52 as an exemplary user equipment and base station 50B as an exemplary radio access node (e.g., example base station). The electronic device 52 may detect the base stations 50B many different ways, including for example, by receiving one or signals emitted from the base station 50B. As discussed above, the base stations 50 shown in FIG. 7 may each correspond to one or more network operators 54. One network operator 54 may deploy its communication network via each of the depicted base stations 50, or multiple network operators 54 may deploy multiple networks via respective of the base stations 50. Indeed, two or more base stations 50 may correspond to one network operator 54, and communicate with user equipment while the user equipment is disposed or located within its serving cells as discussed above.

At block 124, the electronic device 52 transmits a registration request to the base station 50B. The electronic device 52 may transmit the registration request in response to detecting the base station 50B. The registration request may be associated with operations to register or authenticate a subscriber identification module (SIM) card of the electronic device 52 to the base station 50B and/or to a network operator 54 deploying a radio network using the base station 50B. The base station 50B may use information of the registration request, such as identifiers and/or authentication keys, to verify that the electronic device 52 is permitted to communicate using the radio network.

At block 126, the electronic device 52 receives a communication configuration from the base station 50B that includes a spectrum allocation assignment. The spectrum allocation assignment may correspond to an assignment determined by the SAS entity 56, and thus may correspond to one of many channels 76 described with reference to FIGS. 8-9B. In some cases, the spectrum allocation assignment indicates the center frequency corresponding to the channel 76 assigned for communication. In other cases, however, the electronic device 52 may receive an indication of a subcarrier of the channel 76 particularly allocated by the base station 50B for use in communications with the electronic device 52. The indication of the subcarrier may correspond to a frequency range within a respective channel 76 to be used for communication between the electronic device 52 and the base station 50B (where other electronic devices communicating with the base station 50B may use a different subcarrier of the channel 76 for transmitting of messages). The communication configuration may also include uplink allocation timing, downlink allocation timing, other definition of communication slots and/or timings, or the like, for the electronic device 52 to reference when scheduling transmit operations or receive operations.

At block 128, the electronic device 52 communicates with the base station 50B using the spectrum allocation assignment. Indeed, the electronic device 52 may communicate at least partially concurrently or simultaneously with one or more other electronic devices 10 communicating with the base station 50B. The electronic device 52 may align messages for uplink operations to a center frequency associated with the center frequency of the subcarrier and/or of the channel 76 indicated by the spectrum allocation assignment. Furthermore, when receiving downlink communications, the electronic device 52 may anticipate messages being downloaded using the center frequency.

To elaborate on complementary operations to the method 120 with respect to a base station 50, FIG. 11 is a flowchart of a method 140 for operating a respective base station of the base stations 50, such as the base station 50B, to request and use an allocated portion of the radio spectrum 70, according to embodiments of the present disclosure. It is noted that, although depicted in a particular order, the blocks of the method 140 may be performed in any suitable order, and at least some blocks may be skipped altogether. As described herein, the method 140 is described as performed by the base station 50B, however, it should be understood that any suitable processing and/or control circuitry may perform some or all of the operations of the method 140, such as the electronic device 10 which may include the base station 50. As such, operations of the method 140 may be performed by the one or more processors 12.

At block 142, the base station 50B receives a registration request from the electronic device 52 and transmits an indication of the registration request (or a modified version of the registration request) to the network operator 54 to verify that the electronic device 52 is eligible for communication with the base station 50B. The indication may include at least some of the information passed along in the registration request, including authentication information stored on a SIM card (e.g., a SIM card identifier used to identify a device using the SIM card as authorized user equipment) of the electronic device 52 for use by the network operator 54 and/or base station 50B when verifying the electronic device 52. For example, the network operator 54 may verify that the electronic device 52 is authorized to communicate on its network. Indeed, when the electronic device 52 enters a boundary of a corresponding cell, the base station 50B may receive the registration request asking to initiate communication with the electronic device 52. The electronic device 52 may transmit the registration request to the base station 50B in response to determining that is the electronic device 52 itself is within a boundary of one of the cells managed (e.g., served) by the base station 50B, in response to a request for registration received from the base station 50B, or the like. Indeed, the base station 50B, in some cases, may transmit the request for registration to the electronic device 52 to indicate that the user equipment has entered a serving cell managed by the network operator 54.

At block 144, the base station 50B receives confirmation of registration from the network operator 54. That is, the network operator 54 may confirm that the electronic device 52 is registered to the network managed by the network operator 54. In some cases, this operation may be skipped, such as when the base station 50B communicates with other base stations 50 regarding a registration status of the electronic device 52 to the network (e.g., such that each respective authentication operation is bypassed after the electronic device 52 is verified once).

At block 146, the base station 50B transmits a spectrum grant request to an SAS entity 56 and may receive a channel allocation assignment from the SAS entity 56 in response to its request. The spectrum grant request may include a usage type parameter indicative of an operation to be implemented by the network operator 54 via the base station 50B, and more particularly indicative of whether the network operator 54 desires to perform DSS or non-DSS operations and indicative of what networks are to be used by the network operator 54. In some embodiments, the transmission of the spectrum grant request may occur prior to at least some operations of the block 142, such as in response to the base station 50B initially powering-on and/or detecting a first electronic device 52. Once determined, a channel allocation assignment may be used for multiple communication operations between multiple electronic devices 52, such as until the channel allocation assignment expires and/or a message is received from the SAS entity 56 indicating to the base station 50B to pause (or stop) use of the channel allocation assignment. This may happen, for example, in response to a higher priority network operator 54 requesting a same channel allocation assignment as the allocated channel assignment. The channel assignment may be allocated to meet any suitable raster requirements to fulfill the operation indicated via the usage type parameter.

At block 148, the base station 50B determines the spectrum allocation assignment for the electronic device 52 from the channel allocation assignment. In this way, the base station 50B may assign a sub-channel from the bandwidth of the channel 76 indicated by the channel allocation assignment as assigned by the SAS entity 56 to the network operator 54. The base station 50B may determine the sub-channel based on which next sub-channel is to be used, based on a priority of the electronic device 52 relative to other devices of the network, or the like. In some cases, the base station 50B may assign the whole channel 76 to the user equipment, or may assign two or more sub-channels of the channel 76 to the user equipment. Furthermore, in some cases, the base station 50B may vary a width of sub-channels assigned to the user equipment. For example, a first user equipment may be assigned a channel having a 3 MHz bandwidth and a second user equipment may be assigned a channel having a 5 MHz bandwidth.

At block 150, the base station 50B transmits a communication configuration to the electronic device 52 that includes the spectrum allocation assignment for the electronic device 52. The communication configuration may include other information, such as indications of downlink allocations, uplink allocations, a duration of time for which the sub-channel assignment is valid, and the like. For example, the base station 50B (at a later time during communication with the electronic device 52) may access the communication configuration corresponding to the electronic device 52 to determine a message as incoming from the first user equipment (i.e., to determine an uplink allocation is upcoming). In response to determining the message as incoming, the base station 50B may pause transmission of another message to the electronic device 52 (e.g., may pause downlink communications as to not interrupt or interfere with the uplink communication from the electronic device 52). The base station 50B may then receive the message from the electronic device 52, such as via a sub-channel assigned to the electronic device 52 in the communication configuration (e.g., spectrum allocation assignment). The base station 50B may also access the communication configuration to determine when a next downlink allocation is scheduled (e.g., to determine an upcoming downlink allocation to start at a first time), and may transmit the message that was paused at the start of the next downlink allocation (e.g., may transmit the paused message at the first time) to the electronic device 52.

Figures 12, 13:
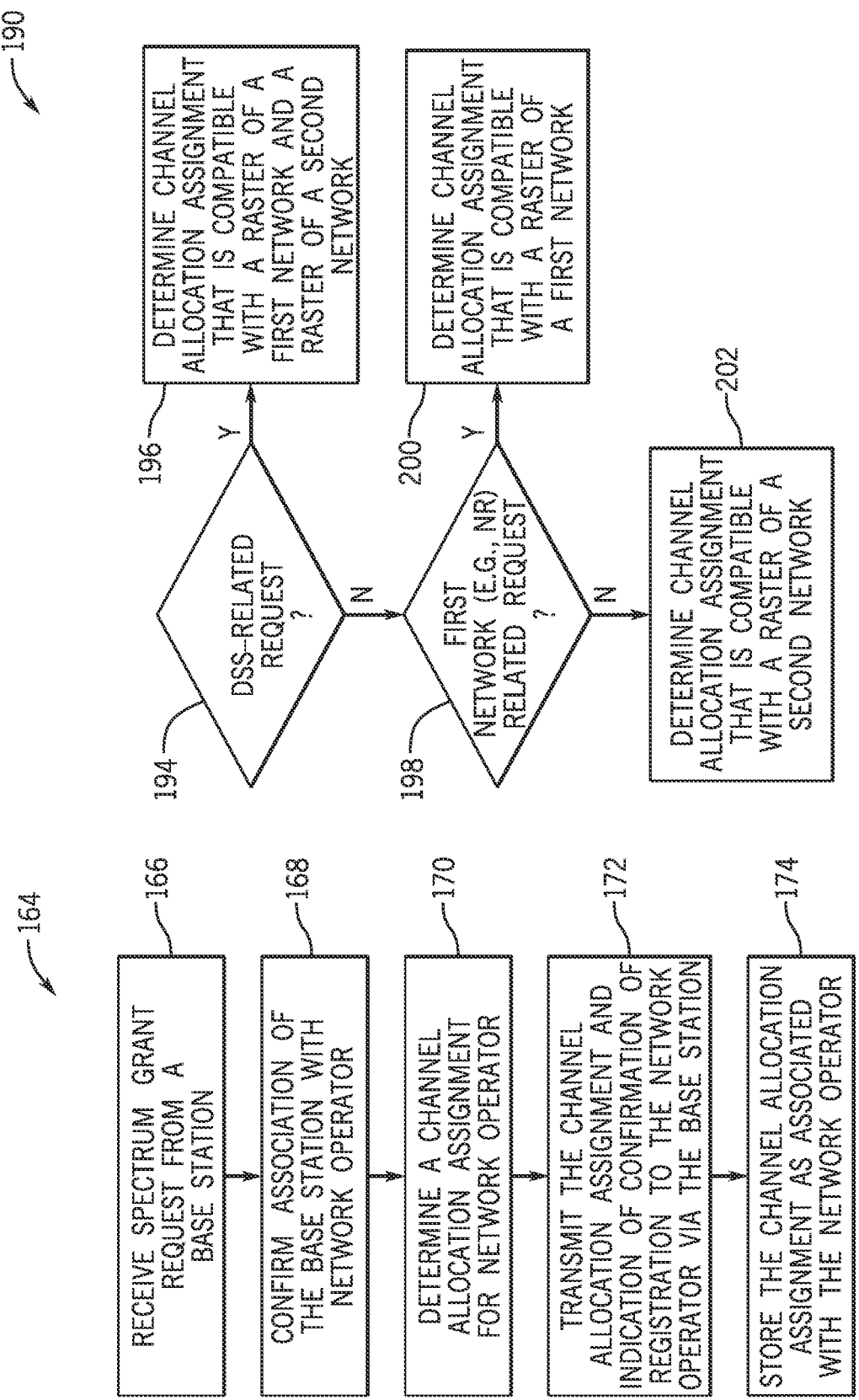
FIG. 12 is a flowchart of a method for operating a spectrum access system (SAS) entity to allocate a portion of the spectrum of FIG. 8 to the base station, in accordance with an embodiment of the present disclosure.
FIG. 13 is a flowchart of a method for operating a spectrum access system (SAS) entity to determine the portion of the spectrum of FIG. 8 to assign to the base station, in accordance with an embodiment of the present disclosure.

To elaborate on complementary operations to the method 120 and to the method 140 with respect to the SAS entity 56, FIG. 12 is a flowchart of a method 164 for operating the SAS entity 56 to allocate a portion of the spectrum portion 74 to the base station 50B, according to embodiments of the present disclosure. It is noted that, although depicted in a particular order, the blocks of the method 164 may be performed in any suitable order, and at least some blocks may be skipped altogether. As described herein, the method 164 is described as performed by the SAS entity 56, however, it should be understood that any suitable processing and/or control circuitry may perform some or all of the operations of the method 164, such as an electronic device 10 acting as the SAS entity 56 and using one or more of the processors 12 to perform operations of the method 164.

At block 166, the SAS entity 56 receives the spectrum grant request from the base station 50B (e.g., transmitted at block 146 of FIG. 11). The spectrum grant request may include information such as whether the base station 50B is expecting to perform DSS operations or non-DSS operations, the one or more networks that the base station 50B is expecting to communicate on (e.g., 5G/NR and/or 4G/LTE), a preferred bandwidth for the channel allocation (e.g., 10 MHz, 20 MHz), and/or the like. Indeed, the spectrum grant request may include the usage type parameter that indicates an operation to be implemented by the network operator 54, such as whether the operations are to be DSS operations or non-DSS operations, and which network types (e.g., 5G/NR, 4G/LTE) are to be used by the network operator 54. The spectrum grant request may also include a low frequency and/or a high frequency of a preferred frequency band and/or an identifier for the base station 50B and/or the network operator 54. The identifier may uniquely identify the base station 50B and distinguish the base station 50B from the other base stations 50, and/or may include an indication of the network operator 54. Data included in the spectrum grant request may represent a variety of data types, and thus may include data types of strings, number, objects, Boolean values, NULL values, or the like.

At block 168, the SAS entity 56 confirms association of the base station 50B with the network operator 54. In particular, the spectrum grant request may include an authentication parameter that enables the SAS entity 56 to confirm the association of the base station 50B with the network operator 54. This may involve verifying that an identifier of the base station 50B corresponds to a list of known associations between base stations 50 and the network operator 54.

At block 170, the SAS entity 56 determines a channel allocation assignment for the network operator 54 corresponding to the base station 50B. To do so, the SAS entity 56 may query its memory to determine whether a channel allocation assignment has already been provided to the network operator 54, and, if so, may report the previously reported channel allocation assignment to the base station 50B if the channel allocation assignment remains active and/or valid (e.g., has not yet timed out or been invalidated due to a change in operation or cumulative network demand from each network operator 54). The SAS entity 56 may determine the channel allocation assignment as a channel that satisfies a maximum number of criteria or parameters included in the spectrum grant request. The SAS entity 56 may, in some cases, assign more than one channel to a network operator 54. The multiple channel assignments may be in response to a parameter included in the spectrum grant request, in response to stored rule defining a particular parameter to be followed or satisfied when assigning a channel to the network operator 54, in response to the SAS entity 56 receiving multiple spectrum grant requests from different base stations 50 of the network operator 54, or the like.

Indeed, to do so, the SAS entity 56 may test out different channels and determine a number of preferences met by the hypothetical assignment to the network operator 54 before determining which hypothetical assignment yields the relatively better outcome for the network operator 54 (e.g., matches the highest number of preferences). Indeed, the SAS entity 56 may use any suitable algorithm to meet a maximum or relatively high number of criteria or parameters in the spectrum grant request. This may also involve the SAS entity 56 resolving any higher priority spectrum grant requests prior to resolving the spectrum grant request of the base station 50B. It is also noted, however, that in some embodiments, the SAS entity 56 may resolve one or more spectrum grant requests by determining a relatively best-case scenario that satisfies a higher number of preferences requested by a variety of network operators 54.

For example, the SAS entity 56 may identify unallocated channels corresponding to the raster requirements for the different networks of multiple spectrum grant requests. The SAS entity 56 may compare each preference of the multiple network operators 54 requesting assignment of an unallocated channel. The SAS entity 56 may resolve as many preferences with hypothetical assignments to obtain a preference-granted metric (e.g., percentage value indicating a total number of network operator 54 preferences satisfied divided by a total number of network operator 54 preferences). Then, once a threshold number of hypothetical assignments are generated, the SAS entity 56 may enact the hypothetical assignment corresponding to the relatively highest preference-granted metric. When there is a tie between two or more hypothetical assignments (e.g., where a network operator 54 is not able to have 100 percent (%) of preferences filled), a final decision may be based on granting the higher priority network operators 54 a channel that satisfies relatively higher amounts of their preferences and/or meets 100% of their preferences when compared to meeting preferences of lower priority network operators 54. This determination may involve the SAS entity 56 acting upon the "spectrum usage" parameter (e.g., UsageType) from the spectrum grant request and allocating spectrum on the corresponding raster that is compatible with the spectrum usage parameter. Furthermore, in some embodiments, the SAS entity 56 may prioritize certain parameters, such as either based on its own prioritization, input from one of the base stations 50, or both, and may determine the channel assignment based on meeting higher priority parameters before meeting lower priority parameters.

At block 172, the SAS entity 56 transmits the channel allocation assignment for the network operator 54 to the base station 50B and, at block 174, stores the channel allocation assignment in memory as associated with the network operator 54 and/or base station 50B. That is, the SAS entity 56 may store an indication of the channel allocation assignment in memory as associated with the identifier for the base station 50B and/or the network operator 54 (received at block 166).

To elaborate further on operations that the SAS entity 56 may perform to determine the channel allocation assignment, FIG. 13 is a flowchart of a method 190 for operating the SAS entity 56 to determine a channel to assign to the base station 50B when performing operations of block 170 of the method 164 of FIG. 12, according to embodiments of the present disclosure. It is noted that, although depicted in a particular order, the blocks of the method 190 may be performed in any suitable order, and at least some blocks may be skipped altogether. As described herein, the method 190 is described as performed by the SAS entity 56, however, it should be understood that any suitable processing and/or control circuitry may perform some or all of the operations of the method 190, such as an electronic device 10 via one or more of the processors 12.

The SAS entity 56 may determine of a channel allocation assignment for a network operator 54 at block 170 of FIG. 12. When performing operations of block 170 of FIG. 12, the SAS entity 56 may determine whether the spectrum grant request includes indication of the network operator 54 using DSS operations. These determinations may include performance of operations of the method 190 of FIG. 13. Indeed, after resolving any high priority requests (e.g., requests for a channel assignment from a network operator 54 associated with a relatively higher priority), the SAS entity 56 may proceed from block 170 of FIG. 12 to determine, at block 194, whether the spectrum grant request corresponds to a DSS-related request (e.g., a request for a channel usable or compatible with DSS operations). In some embodiments, however, it is noted that the SAS entity 56 may assign channel allocations without first resolving priorities of requests, using the priorities of the network operator 54 merely to break ties and/or to determine final assignments in the event that a compromising arrangement is unable to be determined.

Indeed, at block 194, the SAS entity 56 determines whether the spectrum grant request corresponds to a DSS-related request. To do so, the SAS entity 56 may refer to the usage type parameter (e.g., "spectrum usage" parameter, UsageType). The usage type parameter may specify, for a two-network options case (e.g., 4G/LTE vs 5G/NR), whether the network operator 54 is requesting a channel compatible with a first network raster, with a second network raster, or both. For example, the usage type parameter may identify "LTE," "NR," or "LTE/NR DSS" (e.g., spectrum sharing flag). It is noted that other network option cases may be used, such as three or more network options, where each network may be associated with different frequency and/or raster configurations.

In response to determining that the usage type parameter corresponds to a DSS operation, at block 196, the SAS entity 56 determines a channel allocation assignment that is compatible with a raster of a first network and of a second network. For example, certain specifications may define that channels used for 4G/LTE 48 (e.g., n48) band communications are to align with a raster of 100 kilohertz (kHz) while channels used for 5G/NR 48 (e.g., n48) band communications are to align with a raster of 15 kHz or 30 kHz. Thus, when the usage type parameter indicates "LTE/NR DSS," the SAS entity 56 may assign a channel that aligns with both the 4G/LTE raster and the 5G/NR raster, such as 300 kHz. For example, referring to channel 94 of FIG. 9A, the SAS entity 56 may determine that the first operator 92A indicated a preference to use DSS operations, and thus assigns the first operator 92A the channel 94 having a center frequency of 3600 MHz, which is a multiple of the 300 kHz raster.

If the SAS entity 56 determines that the usage type parameter does not correspond to a DSS operation, then, at block 198, the SAS entity 56 may determine whether the spectrum grant request corresponds to a first network related request, such as whether the usage type parameter indicates "LTE." When the SAS entity 56 determines that the spectrum grant request corresponds to the first network related request, at block 200, the SAS entity 56 determines a channel allocation assignment that is compatible with a raster of the first network without concern for whether the channel is compatible with a raster of the second network. For example, the SAS entity 56 may determine the channel to be a channel that aligns with a raster of 100 kHZ used for LTE communications. For example, referring to channel 102 of FIG. 9A, the SAS entity 56 may determine that the fifth operator 92E indicated a preference to use LTE operations but not use DSS operations, and thus assigns the fifth operator 92E the channel 102 having a center frequency of 3625 MHz, which is a multiple of 100 kHz (but not 15 kHz or 30 kHz, e.g., the rasters that may be used for NR communications).

However, when, at block 198, the SAS entity 56 determines that the spectrum grant request does not correspond to the first network related request, the SAS entity 56 may default to determining that the spectrum grant request corresponds to a second network related request and/or may determine that the usage type parameter indicates "NR." As such, when the SAS entity 56 determines that the spectrum grant request corresponds to the second network related request, at block 202, the SAS entity 56 determines a channel allocation assignment that is compatible with a raster of the second network without concern for whether the channel is compatible with a raster of the first network. For example, the SAS entity 56 may determine the channel to be a channel that aligns with a raster of 15 kHZ or 30 kHz used for NR communications. After determining the channel allocation assignment, the SAS entity 56 may proceed to perform operations of block 172 of FIG. 12 (e.g., to perform remaining operations of the method 164).

The method 190 represents one example method of determining the channel allocation assignment for the network provided. Other methods may also be used. For example, in some cases, the base station 50B may not include the usage type parameter in the spectrum grant request. In these cases, the SAS entity 56 may reference rules that indicate operational preferences and/or expectations for each network operator 54. The rules may be stored in a memory (or storage) of the SAS entity 56. In some cases, the rules may be accessible by the SAS entity 56 in a cloud-based storage system also accessible by one or more network operators 54, where the network operators 54 may respectively update communication preferences by updating a definition of a rule in the cloud-based storage system. In this way, a network operator 54 may specify in a rule a preference for implementing DSS operations, and thus the SAS entity 56 may access the rule in memory that indicates the preference when determining a channel allocation assignment for that network operator 54. Keeping this in mind, the methods of FIGS. 10-13 may be altered to accommodate for the use of these rules (e.g., the SAS entity 56 may refer to the rules rather than relying on the usage parameter of the spectrum grant request as transmitted in operations of block 146 of FIG. 11 and received in operations of block 166 of FIG. 12).

Indeed, in some cases, the spectrum grant request may include several parameters that identify the network operator 54 and the base station 50B, such as a user identifier, a governmental identifier corresponding to the network operator 54 (e.g., a Federal Communications Commission identifier (FCC ID)), a serial number and/or identifier of the base station 50B, and/or the like. The rules discussed above may be accessible and searchable by the SAS entity 56 based at least in part on one or more of these identifiers that may be included in the spectrum grant request. Thus, when a particular network operator 54 is interested in defaulting to performing DSS operations (or defaulting to being assigned a channel compatible with performance of DSS operations), the SAS entity 56 may have a rule formed and/or negotiated with the network operator 54 to reference when assigning channels. In this way, when a request is received corresponding to the network operator 54, the SAS entity 56 determines to assign the network operator 54 a channel compatible with DSS operations based on accessing the definition of the rule for the network operator 54. For example, a rule may define that when the first network operator 92A transmits a spectrum grant request to the SAS entity 56, the SAS entity 56 is to default to assigning a DSS operation compatible raster (e.g., include a definition that associates the first network operator 92A to DSS operations for purposes of channel assignment). When defining a rule, the network operator 54 and/or the SAS entity 56 may specify a default action that is to take place when assigning a channel to the network operator 54 in response to the SAS entity 56 identifying a parameter of the spectrum grant request. For example, the SAS entity 56 may determine the spectrum grant request to include an identifier corresponding to the network operator 54, and in response to this determination, access a rule defining a default action to assign to the network operator 54 DSS operation-compatible channel or a non-DSS operation compatible channel Other default actions may involve a default network deployment, default channel bandwidth to be assigned, default number of channels to be assigned to the network operator 54, or the like, or any combination thereof.

The SAS entity 56 may update the rules and definitions indicated by the rules over time, such as when requested by the network operator 54 to update the rule. Indeed, the network operator 54 may initiate the change in the rule from corresponding an identifier for the network operator 54 to a first default action to corresponding the identifier for the network operator 54 to a second default action. In this way, the rule may include a first definition at a first time and a second definition at a second time and where the network operator 54 is able to negotiate or notify with the spectrum access system what definition is stored as the rule. Furthermore, in some cases, there may be communication parameters defined by a standards body, such that when a particular identifier, flag is set, condition is met, a signal is transmitted on a frequency or with a certain amplitude, or the like, the SAS entity 56 knows to assign to a channel compatible with DSS operations to a network operator 54 corresponding to the particular identifier, flag, condition being met, or the like.

It is noted that although described in terms as a single SAS entity 56, one or more SAS entities may perform the operations described herein. When multiple SAS entities manage channel allocations for a particular geographical region, each SAS entity 56 may benefit from knowing when a channel is no longer available for assignment (e.g., previously allocated channel, unavailable for allocation). When multiple SAS entities are assigning channel allocations to different network operators 54 and/or base stations 50, the respective SAS entities may intercommunicate information regarding allocated frequency ranges to reduce, minimize, or eliminate a likelihood of different network operators 54 being assigned a same channel. This communication may be a report that is periodically sent between SAS entities to update each other regarding assignment changes of the channels. In some cases, however, the updates to channel assignments may be transmitted to each of the SAS entities after a channel assignment is determined. By receiving these reports, each of the SAS entities may assign unallocated channels (e.g., unallocated frequency ranges) without inadvertently assigning an allocated channel (e.g., allocated frequency range).

In some cases, when the base station 50B receives the spectrum allocation assignment, the base station 50B may continue on to perform dynamic spectrum sharing (DSS) operations. DSS operations may include the base station 50B determining a current network load (e.g., a first network load) and determining whether the determined current network load is greater than a load threshold. Indeed, the DSS operations may be used to change a network used by the base station 50B to communicate with user equipment, such as in response to changes in network loads (e.g., network demands). For example, the 4G/LTE network may use less bandwidth to downlink a message to a user equipment than 5G/NR, and thus may be more suitable to use when network loads are greater than the load threshold. In this way, in response to determining the current network load is greater than or equal to the load threshold, the base station 50B may transmit a message to the user equipment using the 4G/LTE network (e.g., first network), and in response to determining the current network load is less than the load threshold, transmitting the message to the user equipment using the 5G/NR (e.g., second network). In some cases, the base station 50B, using DSS operations, communicates with a first user equipment using 4G/LTE and with a second user equipment using 5G/NR at least partially simultaneously and without regard for network load.

Technical effects of the present disclosure include systems and methods for improving allocation of resources from a shared pool of network resources by a SAS entity. Indeed, these systems and methods provide for ways for a network operator to communicate with a SAS entity, via a base station, one or more preferences to be considered by the SAS entity when assignment communication channels of a radio spectrum. Each network operator may indicate to the SAS entity whether the respective network operator expects to use a first network, a second network, or DSS operations that use both when communicating with user equipment in its serving cells. When the SAS entity is determining a channel to assign a network operator that has indicated the expected use of DSS operations, the SAS entity may determine a channel that has a center frequency which aligns with a raster compatible with raster definitions for both the first network and the second network. However, when the SAS entity is determining a channel to assign a network operator that has indicated just one network is to be used for communication, the SAS entity may determine a channel that has a center frequency which aligns with a raster compatible with the one network. Relatively defined priorities of the network operators may also be considered by the SAS entity when determining to assign a particular channel.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A base station, comprising:
   a processor; and
   a memory comprising machine-readable instructions that, when executed by the processor, cause the processor to:
      receive a registration request from a user device;
      transmit an indication of the registration request to a network operator to register the user device with the network operator;
      transmit a request for a spectrum allocation to a spectrum access system, the request including a usage parameter indicating that the network operator is to communicate using a spectrum sharing operation, the usage parameter comprising a spectrum sharing flag;
      receive a channel allocation assignment from the spectrum access system, the spectrum access system being configured to generate the channel allocation assignment based at least in part on the usage parameter, the channel allocation assignment defining a range of frequencies used when sending communications to the user device; and
      communicate with the user device using the spectrum sharing operation, the channel allocation assignment, and the range of frequencies.

2. The base station of claim 1, wherein the range of frequencies comprises frequencies between 3550 megahertz (MHz) and 3700 MHz.

3. The base station of claim 1, wherein the range of frequencies is associated with a first raster of 100 kilohertz (kHz) and with a second raster of 15 kHz or 30 kHz.

4. The base station of claim 1, wherein the network operator is configured to communicate with another user device using frequencies associated with a raster of 100 kilohertz (kHz) while communicating with the user device.

5. The base station of claim 1, wherein the network operator is configured to communicate with another user device using frequencies associated with a raster of 15 kilohertz (kHz) or of 30 kHz while communicating with the user device.

6. The base station of claim 1, wherein the network operator is configured to generate the channel allocation assignment based at least in part on a determination of unallocated frequency ranges.

7. The base station of claim 1, wherein the spectrum sharing operation comprises a dynamic spectrum sharing (DSS) operation that enables the network operator, using the range of frequencies, to communicate with the user device on a first network and with another user device on a second network.

8. The base station of claim 1, wherein the indication of the registration request comprises a subscriber identification module (SIM) card identifier.

9. A base station, comprising:
   a transmitter configured to transmit a request for a spectrum allocation to a spectrum access system, the request including an identifier indicating a network operator and a usage parameter indicating that the network operator is to communicate using a spectrum sharing operation, the usage parameter comprising a spectrum sharing flag;
   a receiver configured to receive a channel allocation assignment from the spectrum access system based at least in part on the identifier, the channel allocation assignment defining a range of frequencies used when sending communications to a user device based on a rule associated with the identifier and stored in memory, the rule indicating that the network operator is to communicate using the spectrum sharing operation; and
   one or more processors configured to communicate with the user device via the transmitter and the receiver using the spectrum sharing operation, the channel allocation assignment, and the range of frequencies.

10. The base station of claim 9, wherein the network operator is configured to change the rule to indicate that the network operator is to communicate using a non-spectrum sharing operation, causing the one or more processors to communicate with the user device using the non-spectrum sharing operation.

11. The base station of claim 9, wherein the network operator is configured to change the rule to indicate that the network operator is to communicate using a first network and a second network as part of the spectrum sharing operation, causing the one or more processors to communicate with the user device using the first network or the second network.

12. The base station of claim 9, wherein the spectrum sharing operation involves a first network corresponding to a raster of 100 kilohertz (kHz) and a second network corresponding to a raster of 15 kHz or 30 kHz.

13. The base station of claim 12, wherein the channel allocation assignment corresponds to a raster of 300 kilohertz.

14. The base station of claim 9, wherein the spectrum sharing flag indicates a respective network type of a plurality of network types.

15. A method, comprising:
   transmitting a request for a spectrum allocation to a spectrum access system, the request including a usage parameter indicating that a network operator is to communicate with one or more user equipment using a first network and using a second network, the usage parameter comprising a spectrum sharing flag;

receiving a channel allocation assignment from the spectrum access system, the spectrum access system being configured to generate the channel allocation assignment based at least in part on the usage parameter, the channel allocation assignment defining a range of frequencies used when sending communications to the one or more user equipment; and communicating with the one or more user equipment using a spectrum sharing operation, the channel allocation assignment, and the range of frequencies.

16. The method of claim 15, comprising:

performing dynamic spectrum sharing operations by determining a network load of the second network;

determining whether the network load is greater than or equal to a load threshold;

in response to determining that the network load is greater than or equal to the load threshold, transmitting a message to the one or more user equipment using the first network; and in response to determining that the network load is less than the load threshold, transmitting the message to the one or more user equipment using the second network.

17. The method of claim 15, comprising:

performing dynamic spectrum sharing operations at least in part by:

assigning a first sub-channel aligned with a 100 kilohertz (kHz) raster to a first user equipment of the one or more user equipment;

assigning a second sub-channel aligned with a 15 kHz raster or a 30 kHz raster to a second user equipment of the one or more user equipment; and communicating with the first user equipment using the first sub-channel while communicating with the second user equipment using the second sub-channel.

18. The method of claim 15, comprising:

assigning to a first user equipment of the one or more user equipment a first sub-channel of the range of frequencies and assigning to a second user equipment of the one or more user equipment a second sub-channel of the range of frequencies, wherein the range of frequencies comprises a center frequency aligned on a 300 kilohertz (kHz) raster;

transmitting a first message via the first sub-channel to the first user equipment, wherein the first sub-channel is used for communicating via the first network; and transmitting a second message via the second sub-channel to the second user equipment, wherein the second sub-channel is used for communicating via the second network.

19. The method of claim 18, comprising:

pausing transmission of a third message to the first user equipment based at least in part on a communication configuration corresponding to the first user equipment; and receiving a fourth message via the first sub-channel from the first user equipment.

20. The method of claim 19, comprising:

determining an upcoming downlink allocation to start at a first time based at least in part on the communication configuration corresponding to the first user equipment; and transmitting the third message at the first time.

* * * * *